UNITED STATES PATENT OFFICE.

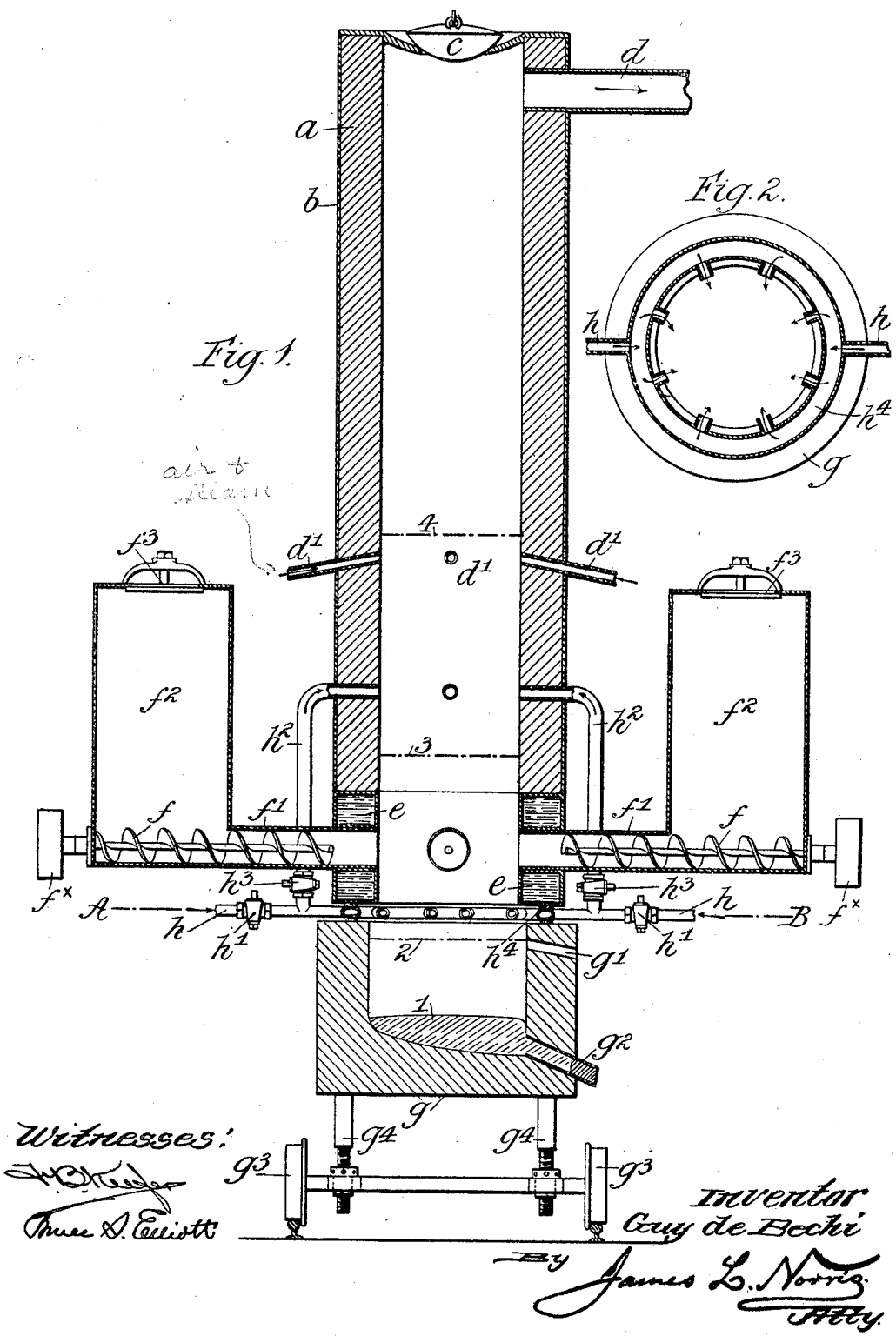

GUY DE BECHI, OF PARIS, FRANCE, ASSIGNOR TO THE GENERAL METAL REDUCTION COMPANY, LIMITED, OF LONDON, ENGLAND.

PROCESS OF TREATING ZINC-BEARING COMPLEX ORES.

SPECIFICATION forming part of Letters Patent No. 681,609, dated August 27, 1901.

Application filed March 19, 1900. Serial No. 9,320. (No specimens.)

*To all whom it may concern:*

Be it known that I, GUY DE BECHI, chemical engineer, a subject of the King of Italy, residing at 17 Boulevard de la Madeleine, Paris, in the Republic of France, have invented a certain new and useful Process of Treating Zinc-Bearing Complex Ores, of which the following is a specification.

This invention relates to the treatment of zinc-bearing complex ores containing zinc and lead, with or without other metals, for the extraction of metals. Ores of this kind have sometimes been treated by roasting them, together with a chlorid salt of an alkali or of an alkaline earth, at a comparatively low temperature. Besides occupying a considerable time and requiring a large quantity of fuel this treatment by chloridizing roasting is in the case of most of the zinc-bearing complex ores rendered difficult and inefficient, owing chiefly, to the formation of fusible zinc chlorid, which remaining with the ore causes the ore to become pasty and prevents a "dead roast" thereof.

Now the chief objects of my invention are to obviate these disadvantages, to facilitate the separation and recovery of the zinc contained in the ores, and to combine in one operation the roasting and the smelting of the ores.

According to my invention I submit the mixture of ore and salt to a comparatively high temperature, and thus drive off the zinc from the ore in the form of vapors or fumes. For this purpose I mix the ore with a chlorid salt of an alkali or of an alkaline earth and smelt this mixture in a cupola-furnace, the air being introduced at different heights in the furnace in such manner that in the higher part of the furnace the mixture of ore and chlorid salt is heated in the presence of an excess of air, whereas in the lower part of the furnace only such an amount of air is introduced as will be necessary to burn the fuel or reducing agent and smelt the ore. The ore prior to this treatment is crushed or pulverized, mixed with the chloridizing salt, and compressed into blocks of suitable size for treatment in the cupola. If required, an appropriate binding agent—such as pitch, lime, or clay—may be added to the mixture before compression. The vapors and fumes given off, which will contain most of the zinc, together with some of the lead and other metals, chiefly in the form of chlorids and possibly a portion thereof in the form of oxids or other salts, are collected in condensing-towers or other suitable arrangement, the metals being subsequently separated by any convenient means. The greater part of the lead contained in the ore is reduced to the metallic state or to a "matte" and falls to the lower part of the furnace and may carry with it most of the silver that is present.

The drawings represent the form of furnace preferably employed.

Figure 1 is a sectional elevation; and Fig. 2 is a section on line A B, Fig. 1.

The upper part of the furnace consists of fire-brick $a$, inclosed in an iron casing $b$. The ore and chlorid salt are fed into the top of the furnace through an opening closed by a suitable cover $c$.

$d$ is an outlet-pipe at the top of the furnace.

$e$ is a water-jacket at the lower part of the furnace.

Fuel is introduced near the top of the water-jacket $e$ by rotary progressive screws $f\ f$ through pipes $f'\ f'$, leading from fuel-hoppers $f^2\ f^2$, closed by suitable removable covers $f^3\ f^3$.

The bottom of the furnace consists of a cupola $g$, provided with a slag-outlet $g'$ and an outlet for metal or matte $g^2$. The cupola $g$ is suitably supported on wheels $g^3\ g^3$, and its height can be regulated by screws $g^4\ g^4$.

$h\ h$ are air-blast pipes provided with regulating-cocks $h'\ h'$ and leading into the furnace between the cupola $g$ and the water-jacket $e$. From the pipes $h$ branch pipes $h^2\ h^2$, provided with regulating-cocks $h^3\ h^3$, lead into the furnace between the water-jacket $e$ and air and steam inlet pipes $d'\ d'$. The pipes $h$ communicate with a circular tube $h^4$, interposed between the top of the cupola and the water-jacket $e$. Asbestos or other suitable packing is placed between the tube $h^4$ and the water-jacket $e$ and also between the said tube and the cupola $g$. The height of the cupola $g$ is adjusted by the screws $g^4\ g^4$, so as to make a tight joint between the tube and the cupola and also between the tube and the water-jacket, and the said joint is then sealed with fire-clay. When in operation, the lower part of the cupola up to the point 1 is filled with metal. Slag extends from the point 1 up to the point 2. The screws $f$ are operated by pulleys $f^\times$, driven from any suitable source of power, so as to keep the fuel filled into the furnace from the point 2 up to the point 3, and the remainder of the furnace is filled with the mixture of ore and chlorid salt. Air is introduced through the pipes $h$ and $h^2$, and a mixture of air and steam is introduced through the pipes $d'$. The air-inlet through the pipes $h\ h$ is regulated so as to keep the fuel in a state of incandescence, and carbonic oxid (CO) and carbonic acid ($CO_2$) are emitted above the point 3. Above the air-inlets $h^2$ there is an excess of oxygen, and above the inlets $d'$ there is a still further excess of oxygen and also hydrogen derived from the steam.

To avoid the presence of a reducing-atmosphere in the top of the furnace, where an oxidizing and chloridizing roasting must take place, fuel is introduced, as shown in the drawings, not from the top of the furnace, as usual, but at the water-jacket at the lower part of the furnace.

In the top of the furnace above the point 4, where the temperature is about 500° to 700° centigrade, an excess of oxygen is present and the sulfur of the ore is converted into sulfurous anhydrid ($SO_2$) or sulfuric anhydrid, ($SO_3$,) which acts on the metal contained in the ore and on the chlorid salt to produce volatile metallic chlorids. Part of the sulfid contained in the ore is also transformed directly into sulfate, which at the above-named high temperature acts on the chlorid salt, forming an alkaline sulfate and chlorids of the metals contained in the ore. As an example, the following equations illustrate the reactions with sodium chlorid (NaCl) and zinc sulfid (ZnS:)

$$ZnS + O_3 = ZnO + SO_2.$$

$$SO_2 + O + ZnO + 2NaCl = \underset{\text{Zinc chlorid.}}{ZnCl_2} + \underset{\text{Sodium sulfate.}}{Na_2SO_4}.$$

$$ZnS + O_4 = ZnSO_4.$$

$$\underset{\text{Zinc sulfate.}}{ZnSO_4} + 2NaCl = \underset{\text{Sodium sulfate.}}{Na_2SO_4} + \underset{\text{Zinc chlorid.}}{ZnCl_2}.$$

In the middle part of the furnace, between the points 3 and 4, the temperature rises to about 800° to 900° centigrade, and there the above reactions are completed. The lead sulfid contained in the ore and possibly some remaining zinc sulfid are transformed into oxides and sulfates and also into silicates by means of the silica contained in the ore. These oxids, sulfates, and silicates descend to the lower part of the furnace. In the bottom part of the furnace the temperature rises above 1,000° centigrade, and here the lead oxids and silicates and the zinc oxids and silicate are reduced to metal by the incandescent fuel, the metallic zinc and part of the metallic lead being driven off as fumes and part of the metallic lead dropping to the lowest part of the furnace and being run off and recovered as metal. The fumes of the metals from the lowest part of the furnace, and especially of the zinc, are again oxidized in the higher parts of the furnace and carried away through the outlet $d$ as oxids, together with the chlorids previously produced in the upper part of the furnace. Steam, which may be introduced together with the air into the middle part of the furnace in the presence of the chlorid salt—say sodium chlorid—and of the sulfurous fumes, above referred to, produces hydrochloric acid, according to the following reaction:

$$SO_2 + O + \underset{\text{Water.}}{H_2O} + 2NaCl = Na_2SO_4 + \underset{\text{Hydrochloric acid.}}{2HCl}.$$

This hydrochloric acid is favorable to the aforesaid formation of volatile chlorids, and any excess of hydrochloric acid is subsequently condensed with the aforesaid metallic fumes and dissolves any zinc oxid that may be present in the condensed fumes. The sodium sulfate is decomposed in the lowest part of the furnace with the production of sodium silicate with the silica contained in the ore, which sodium silicate favors the production of a good fusible light slag.

I wish it to be clearly understood that I do not confine myself to the employment of the furnace shown in the drawings. The essential feature is to introduce the fuel at such a point as to avoid the presence of a reducing-atmosphere in the top part of the furnace.

What I claim is—

1. A process for the treatment of zinc-bearing complex ore for the recovery of metals, which consists in mixing the complex ore with a chlorid salt of an alkali or an alkaline-earth metal, roasting said mixture of the salt and ore and finally introducing a reducing agent and smelting the mixture, the entire process being carried out in one operation at such a high temperature that part of the metals is evolved as fumes of metallic chlorids and oxids and part is recovered as metal, and condensing the said fumes, substantially as described.

2. A process for the treatment of zinc-bearing complex ore for the recovery of metals, which consists in mixing the complex ore with a chlorid salt of an alkali or an alkaline-earth metal, compressing the mixture of the salt and ore into blocks, roasting said blocks and finally introducing a reducing agent and smelting the mixture, the entire process being carried out in one operation at such a high temperature that part of the metals is evolved as fumes of metallic chlorids and oxids and part is recovered as metal, and condensing the said fumes, substantially as described.

3. A process for the treatment of zinc-bearing complex ore for the recovery of metals, which consists in pulverizing the complex ore, mixing said pulverized ore with a binding material and a chlorid salt of an alkali or an alkaline-earth metal, compressing the said mixture into blocks, roasting said blocks and finally introducing a reducing agent and smelting the mixture, the entire process being carried out in one operation at such a high temperature that part of the metals is evolved as fumes of metallic chlorids and oxids and part is recovered as metal, and condensing the said fumes, substantially as described.

4. A process for the treatment of zinc-bearing complex ore containing zinc and lead, which consists in pulverizing said ore, mixing the pulverized ore with a chlorid salt of an alkali or an alkaline-earth metal, roasting said mixture and finally introducing a reducing agent and smelting the mixture, the entire process being carried out in one operation at such a temperature that fumes of zinc chlorid and oxid are emitted and that metallic lead is recovered, and condensing the said fumes, substantially as described.

5. A process for the treatment of zinc-bearing complex ore containing zinc, copper, lead, and silver, which consists in pulverizing said ore, mixing the pulverized ore with binding material and a chlorid salt of an alkali or an alkaline-earth metal, compressing said mixture into blocks, roasting said blocks and finally introducing a reducing agent and smelting the blocks, the entire process being carried out in one operation at such a temperature that fumes of chlorids and oxids of zinc and copper are evolved and that metallic lead and silver are recovered, and condensing the said fumes, substantially as described.

In testimony whereof I have hereunto set my hand, in presence of two subscribing witnesses, this 7th day of March, 1900.

GUY DE BECHI.

Witnesses:
HENRY HASPER,
WOLDEMAR HAUPT.